United States Patent [19]
Will

[11] Patent Number: 5,825,353
[45] Date of Patent: Oct. 20, 1998

[54] CONTROL OF MINIATURE PERSONAL DIGITAL ASSISTANT USING MENU AND THUMBWHEEL

[76] Inventor: Craig Alexander Will, 37675 Fremont Blvd., No. 23, Fremont, Calif. 94536

[21] Appl. No.: 423,690

[22] Filed: Apr. 18, 1995

[51] Int. Cl.$^6$ ..................................................... G06F 3/00
[52] U.S. Cl. .......................... 345/184; 345/352; 345/125; 368/10
[58] Field of Search ..................................... 395/155–161, 395/326–358; 368/10–14, 69–70, 185–190, 280–283, 223–224; 345/156–173, 145–146, 123–125, 121, 117–120, 184, 326–350; 370/94.1; 379/21

[56] References Cited

U.S. PATENT DOCUMENTS

| | | | |
|---|---|---|---|
| 3,541,541 | 11/1970 | Engelbart | 340/324 |
| 3,835,464 | 9/1974 | Rider | 340/324 A |
| 4,395,134 | 7/1983 | Luce | 368/10 X |
| 4,757,115 | 7/1988 | Hatuse et al. | 368/69 |
| 4,922,516 | 5/1990 | Butler et al. | 379/21 |
| 4,982,388 | 1/1991 | Erard | 368/223 |
| 5,088,070 | 2/1992 | Shiff | 368/10 |
| 5,179,502 | 1/1993 | Masuda | 361/392 |
| 5,191,320 | 3/1993 | MacKay | 345/156 |
| 5,208,736 | 5/1993 | Crooks et al. | 361/393 |
| 5,237,657 | 8/1993 | Pearman et al. | 395/164 |
| 5,257,244 | 10/1993 | Thinsen | 368/41 |
| 5,280,276 | 1/1994 | Kwok | 345/167 |
| 5,298,919 | 3/1994 | Chang | 345/163 |
| 5,341,154 | 8/1994 | Bird | 345/167 |
| 5,428,368 | 6/1995 | Grant | 345/163 |
| 5,438,331 | 8/1995 | Gilligan et al. | 345/170 |
| 5,446,481 | 8/1995 | Gillick et al. | 345/163 |
| 5,477,508 | 12/1995 | Will | 368/189 |
| 5,479,408 | 12/1995 | Will | 370/94.1 |
| 5,530,455 | 6/1996 | Gillick et al. | 345/163 |
| 5,543,588 | 8/1996 | Bisset et al. | 345/173 X |
| 5,563,631 | 10/1996 | Masunaga | 345/169 |
| 5,579,489 | 11/1996 | Dornier et al. | 345/173 |

OTHER PUBLICATIONS

Dunkin, Amy, "Smart Assistants", Business Week, Oct. 4, 1993, pp. 124–125.

Mills, Joshua, "Among Desktop Users, Suport Grows for the Trackball", New York Times, Jan. 9, 1995, p. 12.

Anonymous, "Timex and Microsoft Team Up on a Watch", New York Times, Jun. 22, 1994, p. D5.

Arnst, Catherine, "PDA: Premature Death Announcement", Business Week, Sep. 12, 1994, pp. 88–89.

McCraken, Harry, "Phone Capabilities are Simon PDA's Bright Spots", Info World, Oct. 31, 1994, pp. 119–120.

Lampson, Butler, Personal Distributed Computing: The Alto and Ethernet Software. In Goldberg, Adele, A History of Personal Workstations, ACM Press, New York, 1988 pp. 293–335.

*Primary Examiner*—John E. Breene

[57] ABSTRACT

A method and apparatus for control of a handheld miniature personal digital assistant, based on a user interface with a menu and thumbwheel. The device consists of a microprocessor, memory, display, thumbwheel, and button. The display presents a sequence of menu items, with one such item designated as tentatively selected by displaying it in reverse video. Rotating the thumbwheel results in moving the designation of an item in the menu, while pressing the button selects an item. The thumbwheel itself can serve as the button if it is pressed rather than rotated. The use of complex menus that display items in two dimensions allows the use of sophisticated applications, including those that require the entry of alphanumeric data, such as a telephone and address directory and datebook. The approach makes such applications feasible in a credit-card-sized package; without the necessity of a keyboard, allowing most of the surface area of the package to be devoted to a display.

20 Claims, 12 Drawing Sheets

CONTROL OF MINIATURE PERSONAL DIGITAL ASSISTANT USING MENU AND THUMBWHEEL

CROSS-REFERENCE TO RELATED APPLICATION

This application relates to the following copending applications, all submitted by Craig A. Will: "Control of Digital Watch Using Menu and Thumbwheel", filed on May 31, 1994 (Ser. No. 08/251,207), "Automatic Setting of Timepiece by Telephone", filed on Dec. 27, 1994 (Ser. No. 08/363,930), and "Wireless Personal Paging, Communications, and Locating System," filed on Feb. 22, 1994 (Ser. No. 08/200,065).

FIELD OF THE INVENTION

The invention disclosed here relates generally to information processing systems for the presentation of data with interactive operator interfaces based on a menu and to selective visual display systems with input devices for cursor mark position control.

More specifically, the invention relates to a method and apparatus for the control of a miniature handheld computing system and the input of alphanumeric characters to such a system, in which data is presented on a display in the form of a menu and in which a thumbwheel or rotating cylinder is used for the control of a cursor mark position and a selector button is used to make a desired choice.

BACKGROUND OF THE INVENTION

The continuing rapid increase in the density of microelectronic circuits has led to hand-held computing devices that have increasingly sophisticated capabilities. Such devices have come to be called "Personal Digital Assistants" (PDAs). A personal digital assistant is a handheld computing device, containing an internal microprocessor and memory, that is often specialized to a particular application or applications. Typical applications for PDAs including personal organizers, schedulers and datebooks, calendars, and telephone and address directories.

One form of PDA is typified by the Newton developed by Apple Computer, which can accept handwritten or handprinted characters for input (See Ziegler, Bart, "Smart Assistants?", *Business Week*, Oct. 4, 1993, pp. 124–125.) Other devices use highly miniaturized keyboards for input, though in many cases the keys are so tiny that touch-typing is impossible and data entry is difficult. Still others, such as the AT&T/BellSouth Simon, use touch-screen input (see McCracken, Harry, "Phone capabilities are Simon PDA's bright spots", *Info World*, Oct. 31, 1994, pp. 119–120.)

As microprocessor, memory, and other electronic circuits become smaller, it becomes more feasible to construct PDAs of very small size. A particularly advantageous size and shape for a PDA would be that of a credit card, which would allow the PDA to be carried, for example, in a wallet. Such a device would be especially useful for common applications such as telephone and address directories and datebooks, as well as for more specialized applications.

However, as electronic circuitry gets smaller, it is increasingly the case that the limiting factors on the design of miniature PDAs are input devices rather than computation, memory, or display hardware. This can particularly be seen in some of the miniature personal organizers that have appeared that attempt to use keys for control of the device and for alphanumeric input. Such organizers frequently have from 50 to 75 keys, but spaced so closely that control and data entry is difficult and errors are frequent.

The use of handwritten or handprinted input requires the use of a stylus or pen, which can be lost and can be clumsy to use with a very miniaturized PDA. Such automatic recognition also requires computational capacity and memory that may be beyond that feasible or desirable in a credit card-sized device, and may also be unreliable.

The use of a mouse (as disclosed by Engelbart in U.S. Pat. No. 3,541,541 and by Rider in U.S. Pat. No. 3,835,464) is impractical in a handheld device because of the lack of surface area upon which to operate it and because the carrying and use of the mouse itself as an external object is clumsy. A trackball, which consists of a sphere that is directly rotated by a user's finger (see Mills, Joshua, "Among Desktop Users, Support Grows for the Trackball", *New York Times*, Jan. 9, 1994, p. 12) is a more appropriate possibility, but turns out to also be impractical. This is in part because it is difficult for a user to simultaneously coordinate fine motor movements in two dimensions (horizontal and vertical) unless the trackball is relatively large, much larger than could be accommodated in a thin package like that of a credit card.

A stylus, in combination with a display of a simulated keyboard and a touch-screen sensor, could also be used, but in a miniature system touch sensors can be unreliable, and there is also the problem of what to do with the stylus when not in use and how to avoid it being lost by the user.

There is a particular need, then, for alternative ways to control PDAs and for entry of alphanumeric text to PDAs that are contained in very small packages. The invention disclosed here is particularly directed toward this need for a user interface for miniature PDAs that allows simple and effective control of applications and that, in addition, can effectively input small amounts of alphanumeric data.

SUMMARY OF THE INVENTION

The goal of the invention disclosed here is to provide a method and apparatus for the control of a miniature, handheld personal digital assistant and the entry of alphanumeric characters into that device.

The method is particularly applicable to a personal digital assistant the approximate size and shape of a credit card and which contains a telephone and address directory, datebook, calendar, and similar functions. It is also applicable to a cellular telephone, particularly one of small size and in which it is desirable the include a telephone directory and similar functions.

The device consists of a microprocessor, memory, display, rotating cylinder (known as a "thumbwheel") and associated encoder circuitry, and selector button. It may optionally contain a clock and infrared emitter and receiver.

The user interface makes use of menu displays and a rotating cylinder, or "thumbwheel", operated by the thumb or finger of the user, as its primary mechanism for control and data input.

A menu typically lists a set of choices displayed as horizontal lines, with one such line designated as special by some means, such as displaying the text in reverse video (in which normally black characters on a white background are displayed as white characters on a black background). Movement of the thumbwheel up or down results in corresponding movement of the designated item in the menu. The user then presses a selector button to complete the choice.

Frequently, more choices are contained in the menu than can be displayed. When this occurs, only part of the menu is displayed, with additional choices presented by scrolling past the top or bottom choice, as appropriate.

The menu and thumbwheel interface also allows the entry of alphanumeric data without the necessity of a keyboard. In such cases the menus often display multiple menu items on a single line (such as, for example, the digits 0–9), and the designation in reverse video is done only for selection of the item rather than the entire line. In this case, movement of the thumbwheel in a downward direction results in movement of the designation to the right until the rightmost item is designated, after which the designation moves to the leftmost item on the line below.

Typically, the thumbwheel is constructed within a movable frame and associated switch that allows the thumbwheel to also serve as the selector button. The user moves the thumbwheel to the desired position and then presses directly down on the thumbwheel, in a direction toward the package of the PDA, which, given pressure beyond a certain threshold, results in a switch being closed.

The personal digital assistant includes a calendar, datebook, and directory. The calendar shows a month of dates organized as rows and columns in the usual form, with movement of the thumbwheel up or down resulting in displaying a month earlier or later, respectively, than the current month. The datebook shows one day at a time and contains alphanumeric text entered in free format (typically, with a time of day and an event and/or name). The datebook can be scanned day by day by rotating the thumbwheel or searched for a particular character string. The directory contains entries consisting of a name field and a free form alphanumeric text field that can contain company names, addresses, telephone and fax numbers, email addresses, etc. Entries are organized alphabetically according to the name field and can be scanned by movement of the thumbwheel or searched for by specifying a specific sequence of characters in the name field. The PDA can, optionally, contain a clock that can display the time of day, a calculator, and a television/VCR remote controller.

The telephone/address directory can be periodically correlated with a corresponding directory in a workstation, with the PDA directory initially loaded (using two-way infrared light) from the workstation, and updates to either the entries in the PDA or workstation compared with each other and discrepancies resolved either automatically or manually.

The PDA can alternatively be implemented in two packages, each of the size and shape of a credit card, that are connected by hinges that allow the device to fold up for storage. The second card provides a keyboard, with the menu and thumbwheel used for control and the entry of special characters only, not standard alphanumeric characters.

The user interface and telephone directory can also be included as part of a cellular telephone, with the menu and thumbwheel interface used to retrieve a desired telephone number and dial it. Manual dialing might be done either by the standard telephone keys (0–9, #, and *) or with the thumbwheel interface.

DESCRIPTION OF THE PREFERRED EMBODIMENTS

Figure 1:
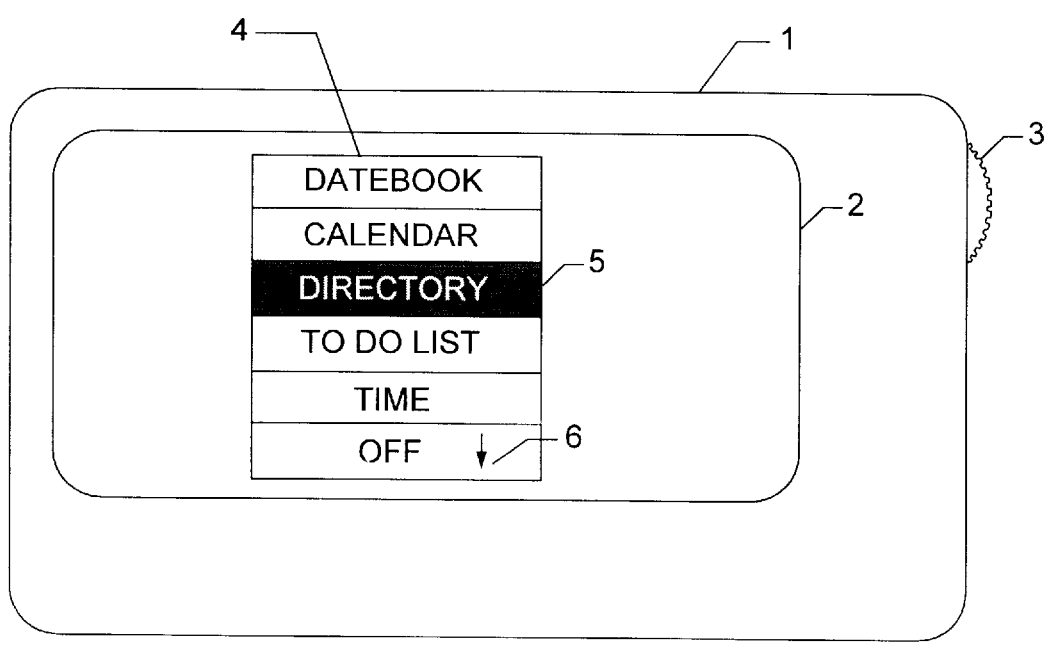
FIG. 1 shows the display, control, and packaging of the personal digital assistant in the configuration in which a thumbwheel serves as a selector button, and an example of a display in the control mode.

FIG. 1 shows the display, control, and packaging of the personal digital assistant in the configuration in which a thumbwheel also serves as a selector button, and an example of a display in the control mode. The device is packaged in the size and shape of a credit card, with the package 1 containing a display 2 and a rotating cylinder or thumbwheel 3. (The term "thumbwheel" doesn't imply that the cylinder is necessarily operated by the thumb—it may also be operated by a finger, depending upon the location of the wheel and the preference of the user.) The display device 2 shows a display of the "Main menu" 4, the primary screen for control of the device. At any given time one item in the menu is designated by some special mode of display, such as reverse video, as shown for the "Directory" item 5. (Alternative ways of indicating such a designation include (1) displaying a symbol, such as an arrow, adjacent to the item; (2) blinking the item; and (3) drawing a line around the item.) Rotating the thumbwheel 3 up or down results in the designation of an item being moved up or down, respectively. In addition, in the case of some menus, those items displayed are only part of the complete menu, with that displayed a window into the complete menu. In those cases moving the designated item to the bottom, for example, will result in a scrolling action that moves the window and displays additional menu items (and erases others). Note the downward arrow symbol 6 that indicates that there are additional items in the menu below the bottom item. If there were additional items above the top item, that item would have an upward arrow. Other items below the "Off" item include "Correlate Directory" and "Calculator".

Pressing the selector button causes the designated item to be selected and the function chosen carried out. If the device is off, pressing the selector button will turn it on. Choosing "Off" in the menu turns the device off.

Depending upon the design of the thumbwheel and selector buttons, there may be a problem with accidental pressing of the selector, which could result in the PDA accidentally going into another mode from the main menu mode and then, with a second accidental press, into still another mode, perhaps eventually destroying data. This can be avoided, if it is a problem, by providing a clock function such that the PDA will not remain in certain modes more than a set amount of time, such as 120 or 240 seconds, returning to the main menu mode after that period of time has elapsed. In addition, for the main menu screen and for other critical screens, the PDA can be set to ignore any selections that are the default selections—that is, the item designated when the menu was first displayed—unless the user moves the thumbwheel to another menu item and then back. This would prevent a second accidental press from moving the PDA past the main menu.

At any time during control of the device a double pressing of the selector button will terminate control mode and cause the device to go back into the main menu mode. Display of each character is in the form of 5×9 pixels that each consist of squares that are turned on or off. The horizontal and vertical lines in FIG. 1 are each one pixel in width, and the menu items in FIG. 1 would be represented as 5×9 matrices of pixels. Pixels are displayed in binary; that is, they are either on or off. (Details of the display at the pixel level are shown in FIGS. 1 and 2 of the copending application "Control of Digital Watch and Menu and Thumbwheel".)

The most typical size for the unit is the 2⅛"×3⅜" standard size of a credit card, with a display of approximately 1⅜"×2¾", which provides space for the thumbwheel, microprocessor, and battery while allowing the card to be reasonably thin. It is expected that the package would have a thickness of 0.25 inches or less. The preferred orientation of the thumbwheel is such that the axis of rotation is perpendicular to that of the plane of the display, which allows a thin package of the credit card size. Such an orientation requires a true "wheel", with the length of the cylinder to be one-fifth or less that the diameter of the cylinder. A display with 8 lines of 20 characters per line would require a 113×205 pixel matrix. Use of less space between characters and horizontal and vertical lines and the use of a 5×5 or 5×7, rather than 5×9, matrix for each character could reduce the matrix required to 67×163 or less.

Figure 2:
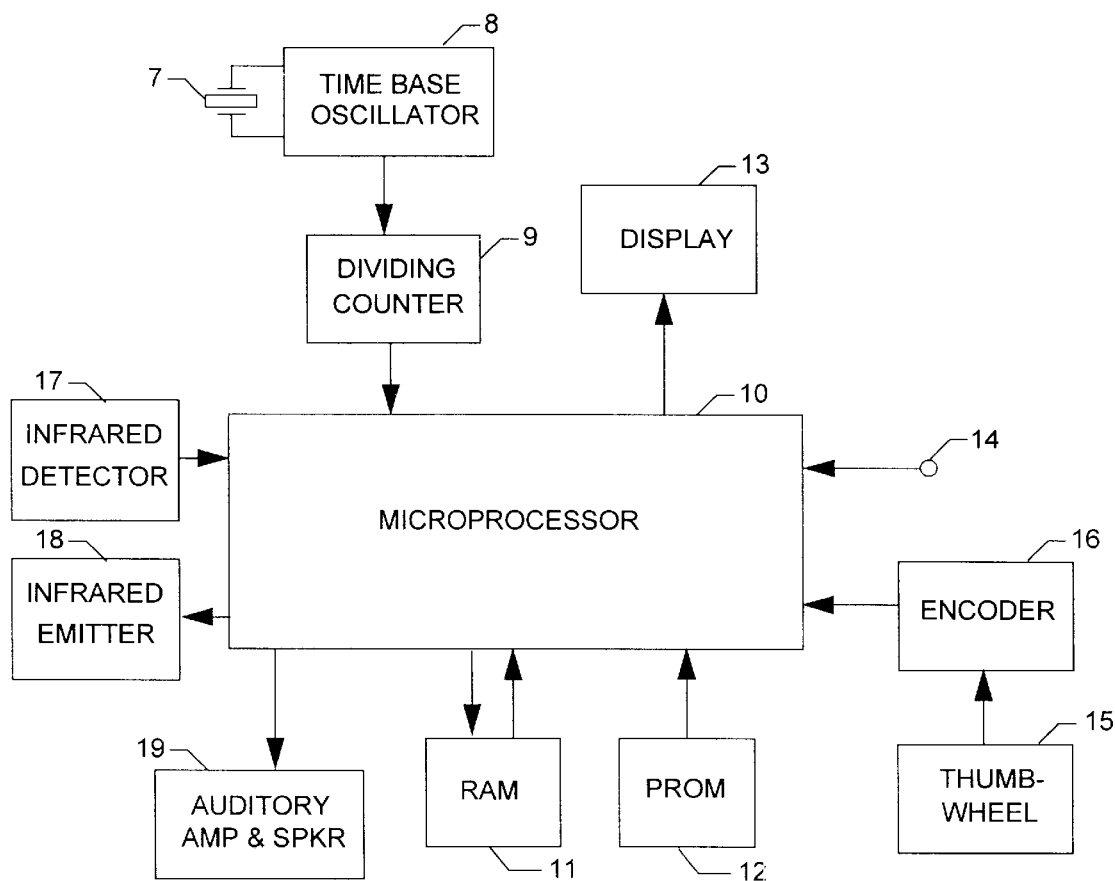
FIG. 2 shows the hardware architecture for the personal digital assistant.

FIG. 2 shows the hardware architecture for the personal digital assistant. A crystal 7 and associated time base oscillator 8 produces a sequence of pulses driving a frequency dividing counter 9 with a 76.8 kHz output frequency. The pulse stream is read into the microprocessor 10, via a program interrupt, which uses this information to update software counters kept in random access memory 11 (RAM) that control all timing functions, and to control infrared communications. The software program controlling the microprocessor 10 is contained in a programmable read only memory 12 (PROM). A display 13 contains a memory, address logic, display drivers, and optoelectronics for display of the characters and other symbols, in the form of binary pixels. A thumbwheel 15 or rotating cylinder operated by the user's thumb or finger is moved by the user when desired, and as it is moved an encoder 16 generates pulses that are transmitted to the microprocessor 10. The encoder coverts rotation of the thumbwheel, which is connected to a shaft, to pulses that encode angular movement. The shaft might, for example, be connected to a disk with holes arranged in a circle, spaced at equal intervals. A light source, such as a light emitting diode, is positioned at a fixed point on one side of the disk while a light sensor, such as a photosensitive diode, is positioned at the other side of the disk. Interruptions of the light as it is passed or blocked by the holes in or solid parts of the disk result in the pulses. A pair of photosensitive diodes spaced appropriately allows both the detection of movement and its direction (by determining which pulse is first). A selector button 14, when pressed by the user, transmits a signal to the microprocessor. An infrared detector 17 senses infrared energy from a connection with a host workstation for receiving data (and acknowledgements) and an infrared emitter 18 transmits data to a host workstation (and receives acknowledgements). An audio amplifier and speaker 19 allows "beep" signals to be generated. The auditory amplifier can also be used to automatically dial a telephone (though the handset microphone) when the number has been retrieved from the directory. Note that both the clock and the infrared detector and emitter are optional, but that the clock is necessary if infrared communication is used.

Figure 3:
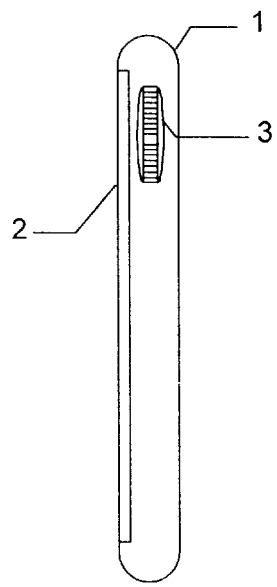
FIG. 3 shows a side view of the personal digital assistant packaging with a thumbwheel that simultaneously serves as a a selector button.

FIG. 3 shows a side view of the personal digital assistant packaging with a thumbwheel that simultaneously serves as a a selector button. The package 1 contains only one control device, the thumbwheel 3. This is convenient for the user because the user can move the thumbwheel and select the result in a single motion, and is also potentially more accurate than using a separate button that may require the user to take his or her thumb or finger off of the thumbwheel (and risk disturbing its position) to press a button elsewhere on the PDA.

Figures 4A, 4B:
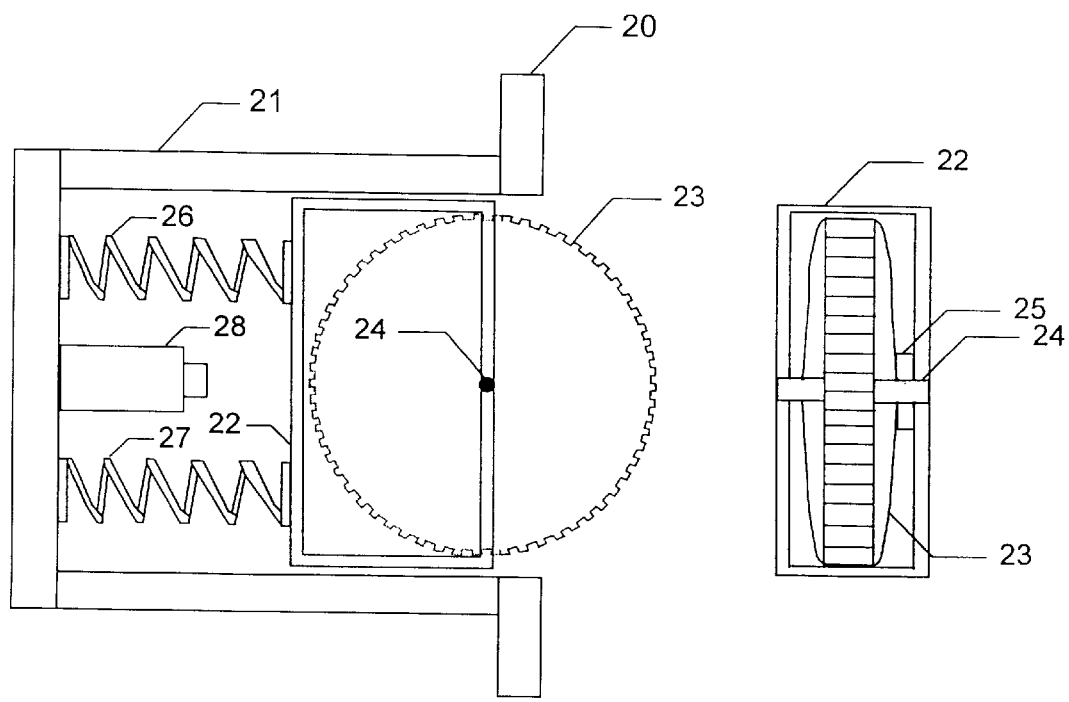
FIGS. 4a and 4b show details of the user interface in which the thumbwheel also serves as a selector button.

FIGS. 4a and 4b show details of the user interface in which the thumbwheel also serves as a selector button. FIG. 4a is a front view of the PDA, showing a blowup beneath the outer packaging and the display in the area near the thumbwheel. The right side of the package 20 contains a fixed frame 21. Within this frame a second movable frame 22, or box, is constructed that contains the thumbwheel 23, with a shaft 24 connecting the thumbwheel to the frame, but sufficiently loosely that the thumbwheel can rotate. FIG. 4b shows a side view (from the right side of the PDA package), including the movable frame 22, thumbwheel 23, shaft 24, and encoder 25. The encoder is in two pieces, a piece attached to the shaft that rotates with the thumbwheel, and a second nonrotating piece that receives and processes the pulses. The rotating piece, for example, can be a disk with holes in it, and the nonrotating piece (attached to the movable frame) a light source and photosensitive diode and associated logic, with the second piece attached by flexible wires (not shown) to the PDA case and microprocessor. As is seen in the front view, when the user has completed rotating the thumbwheel 23 and presses it toward the left (perpendicular to the PDA packaging), the movable frame 22 moves toward the fixed frame 21. The movement is resisted by springs 26 and 27, but, with sufficient force, the frame will move so as to press the switch 28.

Figures 5A, 5B:
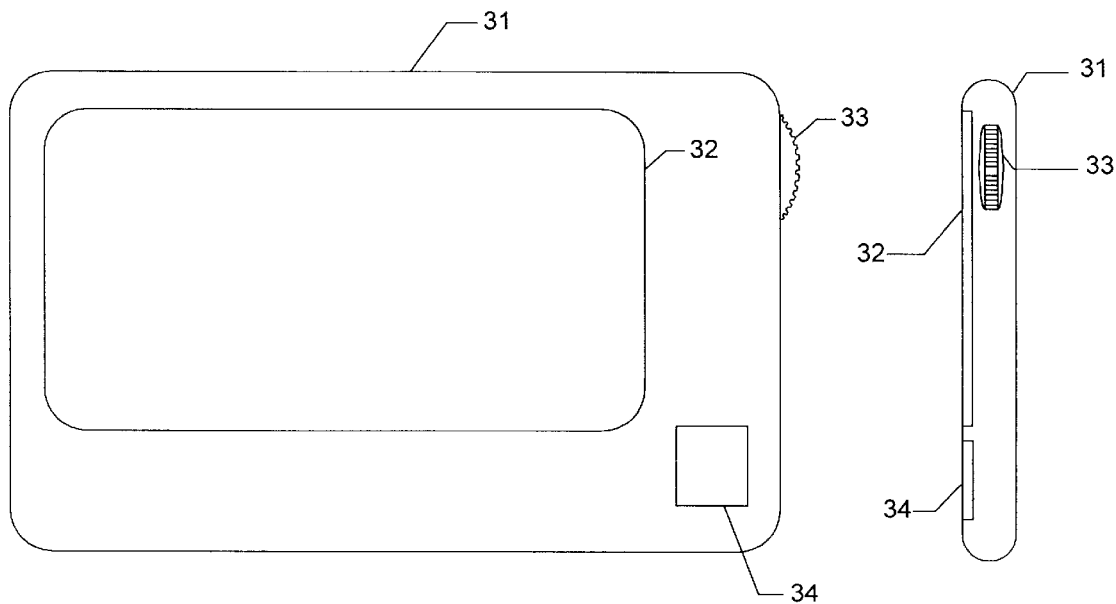
FIGS. 5a and 5b show the packaging of a personal digital assistant that has a thumbwheel and a separate selector button.

FIGS. 5a and 5b show the packaging of a personal digital assistant that has a thumbwheel and a separate selector button. FIG. 5a is a front view, while FIG. 5b is a side view, both showing the package 31, display 32, thumbwheel 33 and selector button 34. The selector button is in the form of a thin-film button, and the thumbwheel and button are arranged such that the thumbwheel can be moved with an index finger and the selector button simultaneously pressed with the thumb.

Figure 6:
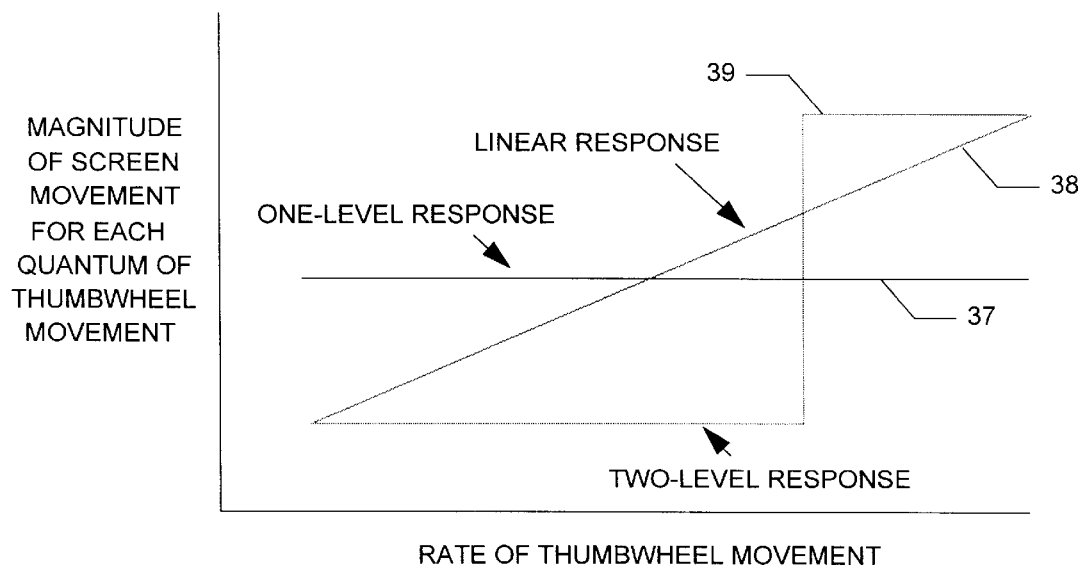
FIG. 6 shows a graph describing the amount of movement of the designation of a menu item on the display screen resulting from physical movement of the thumbwheel at different rates.

FIG. 6 shows a graph describing the amount of movement of the designation of a menu item on the display screen resulting from physical movement of the thumbwheel at different rates. The graph shows the amount of physical movement on the screen resulting from movement of the thumbwheel sufficient to produce a single pulse from the encoder. Three curves are shown. The curve 37 shows a one-level (flat) response characteristic, in which the same amount of display movement results regardless of the rate of thumbwheel movement. The curve 38, in contrast, is used to improve the accuracy of short movements while allowing long movements to be made with greater speed, and has movement on the screen proportional to the rate of thumbwheel movement. The curve 39 has a purpose similar to that of 38, but works in one of two modes, either a "slow, precise" mode or a "rapid, coarse" mode, with the magnitude of screen movement for a given thumbwheel movement constant, depending upon the mode. The ratio between the rapid and slow rates is about 4:1. The two latter curves 38 and 39 are valuable when the thumbwheel is used to select from long sequences of choices, such as digits and operators that are used in a calculator, digits used in entering a telephone number, or letters and digits and control commands used in applications such as telephone and address directories. The two-level (or multiple-level) response is the preferred mechanism because it provides both the slow and precise versus rapid and coarse modes while, within the range of each mode, providing a response in which the distance moved on the screen is proportional to the distance moved by the thumbwheel. This is the more natural response and is likely to be the easiest to learn. A three-level response is particularly useful, with the slower two levels used for menus and the fastest level used for scanning through frames for the datebook, dictionary, and calendar applications.

Figure 7A:
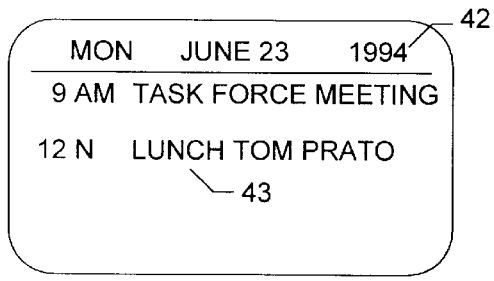
FIGS. 7a through 7f show screens for the datebook and calendar functions.

FIGS. 7*a* through 7*f* show screens for the datebook and calendar functions. FIG. 7*a* shows a screen for the datebook function illustrating the display of text for a particular date. When the datebook function is selected (FIG. 1), a screen is presented, not shown here, that has two primary menu choices: Scan datebook and search datebook. If the scan datebook choice is selected, the screen in FIG. 7*a* is displayed, with the datebook entry for the current date being displayed, unless the device has no clock, in which case the last date accessed is displayed.

Moving the thumbwheel clockwise or counter clockwise causes the date being displayed to change, with earlier dates being displayed when the thumbwheel is moved counter clockwise and later dates displayed when the thumbwheel is moved clockwise. When each date is displayed, the day of the week and date is displayed 42 at the top of the screen and the text entered for the corresponding date is displayed 43.

Figure 7B:
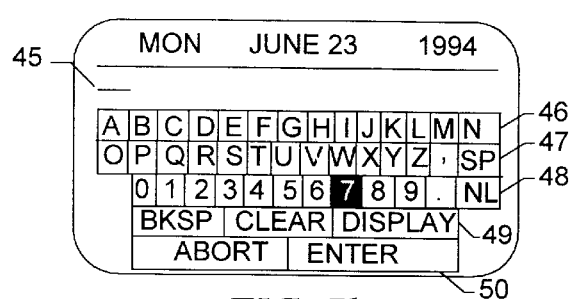

FIG. 7*b* shows a screen for the datebook function illustrating the entry of new text for a date that currently has no entry. When a user scans the datebook by moving the thumbwheel, a blank screen is displayed for any date with no text entry. The user can then make an entry by first pressing the selector button, which results in a cursor 45 being displayed at the location text can be entered and, below that, a menu, including alphabetic characters 46 and 47, the digits 0–9 and special "newline" character 48, and control functions, including "Backspace", "Clear", and "Display" 49, and "Abort" and "Enter" 50. As an example, the digit "7" is designated and displayed in reverse video. Note that the organization of the display of the letters is not necessarily alphabetical. It might, in particular, use three rows and the familiar "Qwerty" format, to take advantage of a user's knowledge of that organization. To enter text, the user moves the thumbwheel to move the designation to the desired character, then presses the selector button. The character thus selected is displayed at the cursor location and the cursor moved one space to the right. If the character was entered on the last character position on the current line, a blank line is added as the next line and the cursor moves to the first position on that line. If the text has a sufficient number of lines, only some of the lines of the menu are displayed at any given time, with 3 or 5 lines displayed, those lines that surround the line containing the last designated character. A "newline" character results in moving the cursor (and text character) to the first position on the next line. A "Bksp" (Backspace) causes the cursor to be moved one position to the left (or to the last position on the previous line) and the character located at the resulting position to be deleted. "Clear" causes the entire text entry to be deleted. "Abort" results in the text being discarded (if just created) and the main menu (FIG. 1) being displayed. "Enter" results in the text just created being entered into the database.

In the case of the entries previously made, the pressing of the selector button after the display of such an entry causes the same menu to be displayed as is the case with no entry, with the cursor displayed just after the last character in the record. Additional text can then be entered immediately by selecting characters from the menu.

The text can be edited by pressing "Bksp" to remove the last character or "Clear" to delete all text in the entry. ("Clear", then "Enter" will effectively delete an entry.) The text can also be more selectively edited by moving the cursor back to some specified location and deleting or replacing characters. Selecting "Disp" (for Display Mode) will display the entire text in the entry.

Figure 7C:
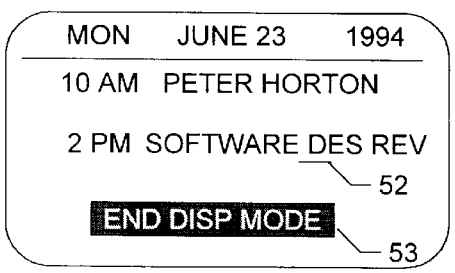

FIG. 7*c* shows a datebook entry in Display mode, which places the interface in a special mode in which movement of the thumbwheel does not move the designation of items in the menu but, rather, moves the display of the cursor. This mode allows both display of the full record and movement of the cursor. Pressing the selector button then permanently sets the cursor 52 at the new value. When the "Display" selection is made to get into Display mode, the "End Disp Mode" menu item 53 is initially designated, and the user must move the thumbwheel counter clockwise to initiate moving the cursor. If the text entry extends beyond a single screen, the "End Disp Mode" item will be displayed at the end of the text entry. The user may have to scroll up to see the entire text entry in that case. If the user wants to return without modifying the cursor location, he or she either moves the cursor to the old location or moves the thumbwheel back so it designates the "End Disp Mode" item, the selection of which will not change the cursor position. When the menu is displayed, the text entry above it will display those lines near the cursor selection.

Figure 7D:
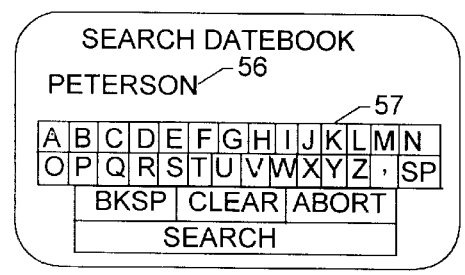

FIG. 7*d* shows the "Search Datebook" function screen, which is entered by a selection from the main menu, and allows entry of a string to search on. The screen includes a field for the search string 56 and a menu 57, with the letters A–Z, comma, and space, and control commands "Bksp", "Clear", "Abort", and "Search". The user designates, then selects a sequence of letters to create the search string 56. "Bksp", or backspace, deletes the last letter entered, while "Clear" erases the entire search string and "Abort" returns to the previous menu. "Search" initiates the search.

Figure 7E:
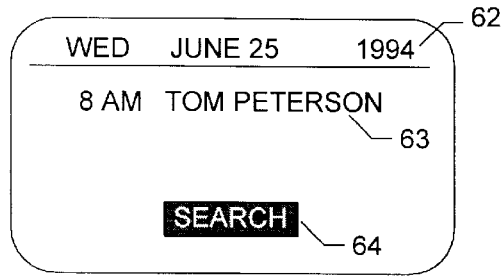

FIG. 7e shows the result of a successful search of the datebook. (An unsuccessful search will return a screen similar to the screen shown in FIG. 7d but with the message "Not found in datebook", allowing the user to modify the search string.) The date of the entry 62 and text entered 63 are displayed, together with a "Search" 64 menu item. Selection of the "Search" item will result in another search of the datebook for the same string. Movement of the thumbwheel will cause the "Search" item to disappear and allow scrolling of the text if there is sufficient text.

Figure 7F:
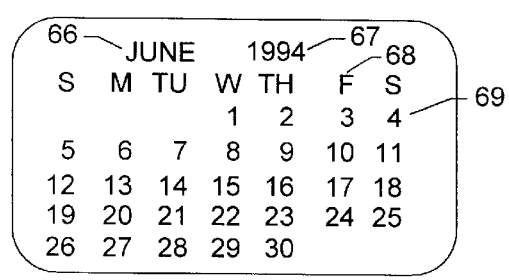

FIG. 7f shows the format of the displays presented by the calendar application. When the calendar application is selected, the default month is first displayed, shown as June, 1994, including the month 66 and year 67, days of the week 68, and dates in the month 69. The default month is the current one if a clock is included in the PDA, and the last month accessed if a clock is not included. The month displayed changes in the forward direction (e.g., July, August, September) if the thumbwheel is moved in a clockwise direction, or in the backward direction (May, April, March) if the thumbwheel is moved in a counterclockwise direction.

FIGS. 8a through 8j show screens illustrating the user interfaces for the directory, time setting, calculator, and TV/VCR control functions.

Figure 8A:
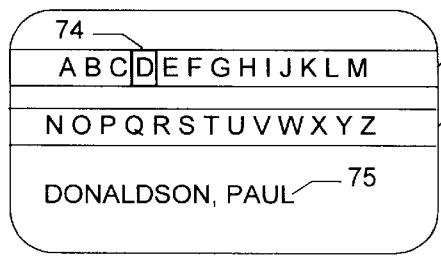
FIGS. 8a through 8j show screens illustrating the user interfaces for the directory, time setting, calculator, and TV/VCR control functions.

FIG. 8a shows the screen format for scanning through the directory, which is displayed when the "Scan directory" item is selected from the main database. When selected, the last record accessed (for either reading or writing) has its name field 75 displayed, together with the alphabet spread across two horizontal lines 72 and 73, with a square 74 showing graphically the first letter of the name and the relationship of this record with respect to other records with the same first letter. Movement of the thumbwheel in a clockwise direction results in display of a record closer to the end of the alphabet—from the record immediately after the present record to a record some distance away—depending upon the distance moved and the speed of movement. When the desired record is displayed, the user presses the selector button.

Figure 8B:
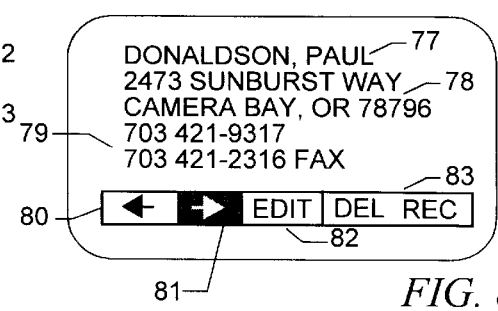

FIG. 8b shows the screen format of a record selected after being displayed by scanning the directory, including the name 77, address 78, and telephone numbers 79. Such data is not kept as separate fields but in the form of a single sequence of characters, with "newline" characters indicating the end of a line. Also shown are menu items for displaying the previous record 80, displaying the next record 81, entering an editing mode 82, or deleting the current record 83. The record initially designates the "previous record" item 80, with movement of the thumbwheel clockwise moving the designation to the right. Note that the record shown is sufficiently short that both the entire record and the menu can be displayed at the same time. If the record was so long as to prevent such display, only the first part of the record would be displayed initially, and clockwise movement of the thumbwheel would result in scrolling until the bottom part of the record can be read, and then the display, and designation, of the menu.

Figure 8C:
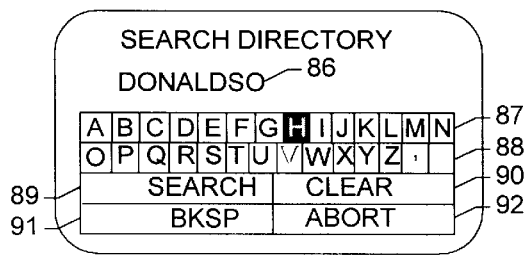

FIG. 8c shows the screen format for searching the directory. Such a search looks for records containing text strings that match the specified string, which may be a name as shown in the example or any other string (e.g., company name, city, street name, etc.). This includes the field containing the string to be searched for 86, letters and other characters 87 and 88, and menu items for "Search" 89, "Clear" 90, "Backspace" 91, and "Abort" 92. The selection of a letter appends it to the search field 86, with the search initiated when the "Search" item is selected. "Backspace" erases the last letter added to the search field 86. "Clear" erases the entire search field 86. (In an alternative embodiment, more than one different "Search" menu item is present, with each having different behavior. One requires a complete (last) name match for retrieval, while another seeks only an embedded string, etc.)

Figure 8D:
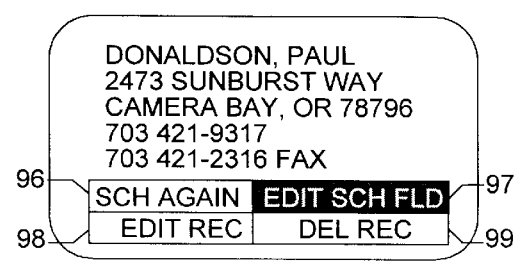

FIG. 8d shows the screen format for displaying records retrieved as a result of a search, with the record shown the same as that retrieved and shown in FIG. 8b. The menu, however, is different, with a command 96 for searching again (with the same search field) and a command to edit the search field 97, which causes a display of the screen shown in FIG. 8c. Other commands are included that edit the record 98 and delete the record 99.

Figure 8E:
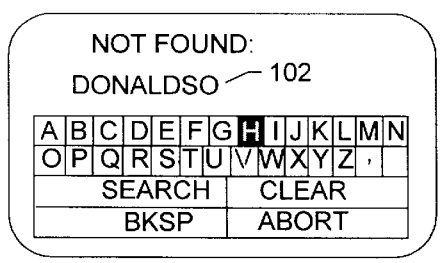

FIG. 8e shows the screen format resulting when no record is found that matches the search criteria. The search field 102 can be modified if desired and the search performed again. The screen functions like that in FIG. 8c.

Figure 8F:
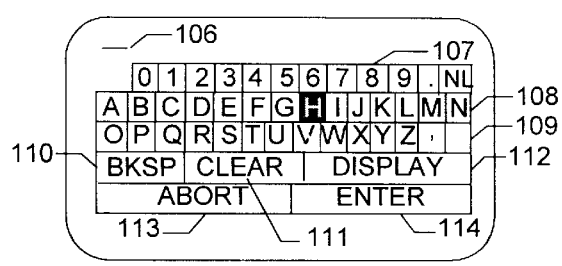

FIG. 8f shows the screen format used for entering data into the directory. This screen is initiated by selecting "Enter in Directory" in the directory screen (not shown). The screen shows a cursor 106 pointing to where a character can be added, a menu of digits (and newline character) 107 and letters 108 and 109. Also included in the menu are "Bksp" 110, "Clear" 111, "Display" 112, "Abort" 113 and "Enter" 114. As in the case of the screen shown in FIG. 7b, selecting a character will result in displaying that character and moving the cursor to the right. "Display" will display the record as in the screen shown in FIG. 7c, and "Enter" will enter the record in memory in the appropriate alphabetical order according to the name field (always the first line in each record).

Figure 8G:
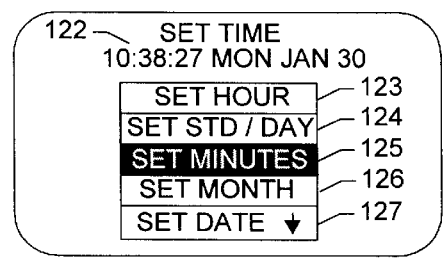

FIG. 8g shows the screen displayed when the time is to be set. The selection of the "Time" item in FIG. 1 displays a screen (not shown) that displays the time of day, date, and day of the week and includes a "Set time" selection that initiates the screen shown in FIG. 8g. The screen includes time and date 122 and menu items 123, 124, 125, 126, and 127. Each of these, if selected, presents a screen for setting a particular parameter.

Figure 8H:
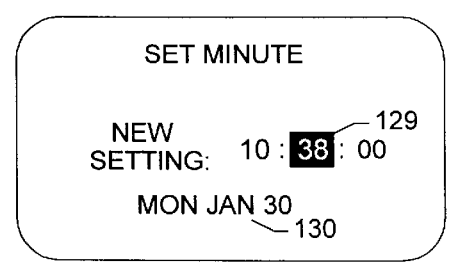

FIG. 8h shows the screen for the "Set minute" selection. This format shows the "New setting" of the time, which is a tentative setting of a new time and month, date, and day-of-the-week 130. The parameter that can be changed 129 is displayed in reverse video, and movement of the thumbwheel counter clockwise or clockwise results in decreasing or increasing, respectively, the new value of the parameter. This does not necessarily yet change the actual value of the time. (Note that alarm, stopwatch, and more sophisticated time setting functions could be added. See the copending application "Control of Digital Watch Using Menu and Thumbwheel" for details on this and on tentative modification of the time and later verification.) Similar formats allow modification of the hour, month, date, and day.

Figure 8I:
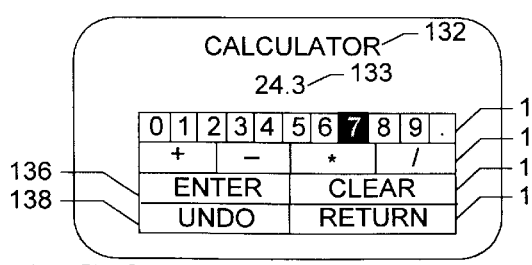

FIG. 8i shows the user interface for the calculator, including screen label 132, calculator accumulator 133, and menu of input items. The menu includes the digits 0–9 and a decimal point 134, operators +, −, *, and / 135, plus the commands "Enter" 136, "Clear" 137, "Undo" 138, and "Return" 139. Movement of the thumbwheel in the clockwise direction moves the selection of a menu item from left to right within a line, and then to the leftmost item on the line just below. Selection of a number or an operator and number (either followed by "Enter") results in the value of the number, or accumulator, operator, and number expression, being evaluated and placed in the accumulator 133. "Clear" will reset the accumulator to 0. "Undo" will result in the last entry being ignored, with the value displayed in the accumulator field reverting to that displayed previous to the last entry. "Return" will cause the main menu 4 (FIG. 1) to be displayed. Note that the movement on the screen resulting from movement of the thumbwheel is carried out at a different rate if more than one menu item is contained on a horizontal line.

Figure 8J:
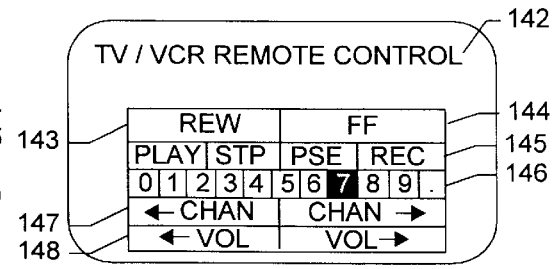

FIG. 8*j* shows a screen for controlling a television and remote videocassette recorder and/or player, including screen label 142 and VCR control commands rewind 143, fast forward 144, and play, stop, pause, and record 145. Remote television controls are also shown, including digits for selecting a channel 146, commands for incrementing and decrementing a channel 147, and turn up and turn down volume 148. Not shown, but available by scrolling down, is a "Return" command, and also other TV and VCR commands. Any command selected results in an appropriate transmission via infrared light, with the screen remaining until "Return" is selected.

Figure 9:
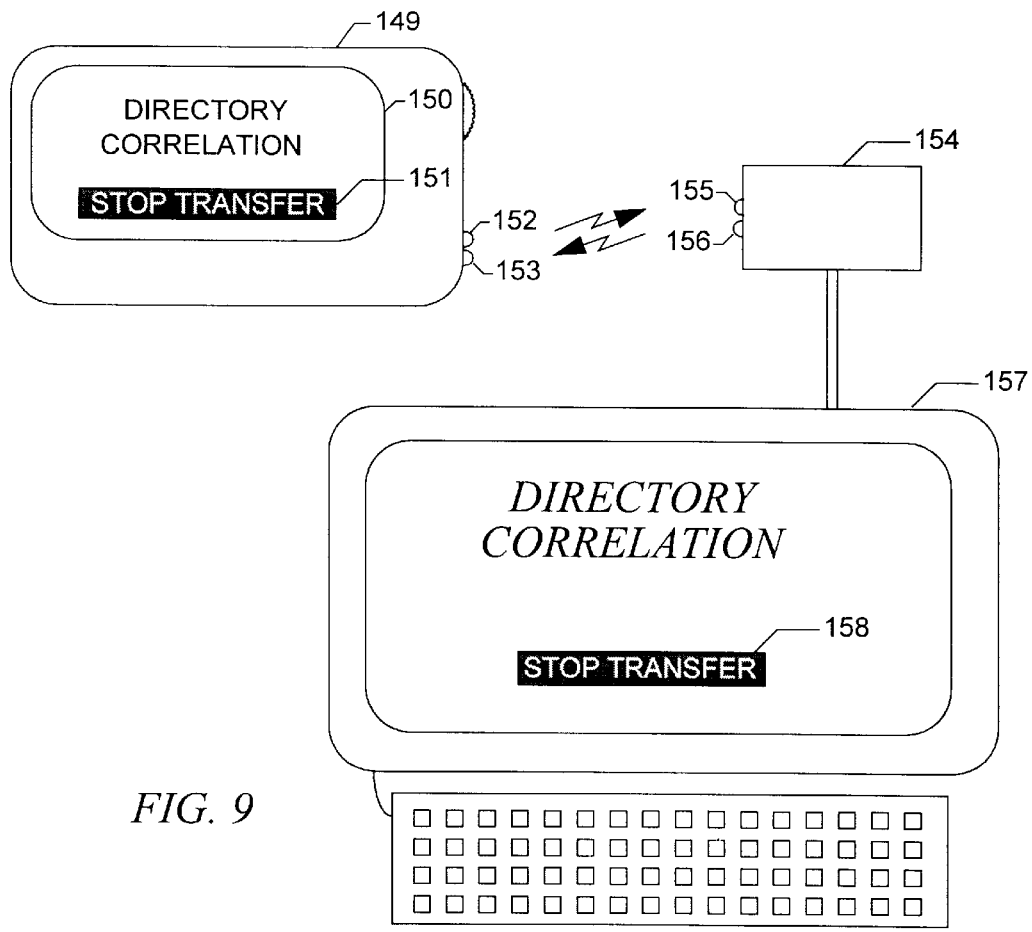
FIG. 9 shows the physical configuration when the optional capability of communication with a host workstation to correlate directory information is carried out.

FIG. 9 shows the physical configuration when the optional capability of communication with a host workstation to correlate directory information is carried out. Note that the same technique can also be used to correlate datebooks that may be contained in both the PDA and a workstation. Data is first transmitted from the personal digital assistant 149 (in "Correlate" mode) via infrared to an infrared communications module 154 connected to a workstation 157. The PDA transmits data from infrared emitter 152, which is received by a photocell 155, and the workstation transmits data from infrared emitter 156, which is received by a photocell 153 contained on the PDA. When the appropriate command is selected in the PDA to initiate correlation, the message "Directory Correlation" is displayed. The process can be stopped at any time by selecting the "Stop Transfer" item 151 on the PDA screen 150, or the analogous item 158 (selected by pressing the RETURN key) on the workstation. When the PDA Directory Correlate function is initiated, the PDA initiates communication with the host workstation by initial transmission of a query message, and initiation of transmission of full data, using a transmission acknowledgement, and retransmission protocol, if the host workstation has responded appropriately. Before initiating the PDA Directory Correlate function, the host workstation directory software is initiated, and a correlate function initiated by selecting the "Start Correlate" choice from a menu. (See the text associated with FIG. 10 for a description of how correlation is carried out.) (An alternative embodiment would use an audio frequency shift keyed digital link between the PDA and workstation, rather than infrared. This could use a speaker and microphone at each end with audio transmitted through the air, or use a wire and miniature connector that plugs into the PDA.)

Figure 10:
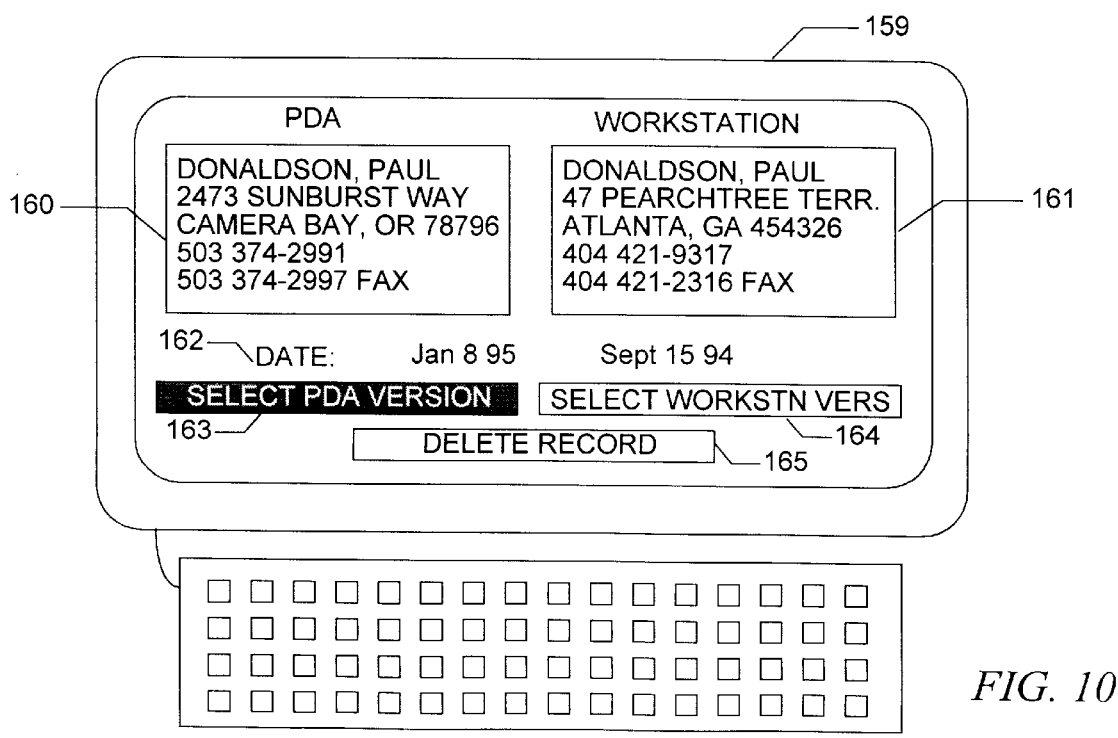
FIG. 10 shows the workstation screen displaying two analogous records while manual correlation is taking place.

FIG. 10 shows the workstation screen displaying two analogous records while manual correlation is taking place.

The Telephone/Address Directory in the host workstation can be any such directory—from software specifically designed for the purpose to a simple text editor. It is desirable that some mechanism be included that tags those records that are to be transmitted to the PDA if the memory of the PDA limits its capacity to less than the number of records contained in the workstation directory. In addition, facilities need to be added for transferring data to and from the PDA, for correlating records and resolving situations in which a record in one database has been updated but the corresponding record in the other database has not, and a facility for tagging each update with the date it was made to allow automatic resolution.

The host workstation directory stores a version of its contents in a file when a transfer to the PDA is made. The PDA then, when making updates that involve deleting and adding records, will maintain its database with reference numbers pointing to the stored version, and tag each update with a date.

The first step in directory correlation is transferring update data only (records added, changes to existing records, and references to deleted records, all including date tags) from the PDA to the host. The unupdated version of the host directory is then updated using this data from the PDA to produce a PDA version of the directory.

The user is then given a choice of whether to do "Automatic" or "Manual" correlation.

In "Automatic" correlation, each record (those tagged to store in the PDA) has its PDA version compared with that in the host workstation. If there is a discrepancy, the record that has most recently been updated is taken as the correct version and stored in the host workstation file.

In "Manual" correlation, any records in which the PDA version and the workstation version are different are displayed side-by-side on the workstation 159 screen, together with the date 162 each was last updated, and the user prompted to select either the PDA 160 or the workstation 161 version by selecting the appropriate menu item 163 or 164. (The user, if desired, can also remove the PDA tag to effectively delete the record from the PDA database by selecting the "Delete Record" item 165).

When all records have been correlated, whether in automatic or manual mode, those records in the workstation memory that are tagged for transfer to the PDA are transmitted via the infrared emitter to the PDA, using a transmission, acknowledgement, and retransmission protocol.

An alternative method (but that doesn't allow correlation) would transfer records (or only those tagged for transfer to the PDA) from the workstation to the PDA, but not in the opposite direction. This could be done using the screen display of the workstation, with data being displayed as moving bar codes or on-off blinking light levels, with the light on the screen sensed by a photosensitive detector in the PDA. This approach is used by Timex and Microsoft in a watch in which telephone numbers are transferred to a workstation in the watch. (See "Timex and Microsoft Team Up on a Watch", *New York Times*, Jun. 22, 1994, p. D5).

Figures 11A, 11B:
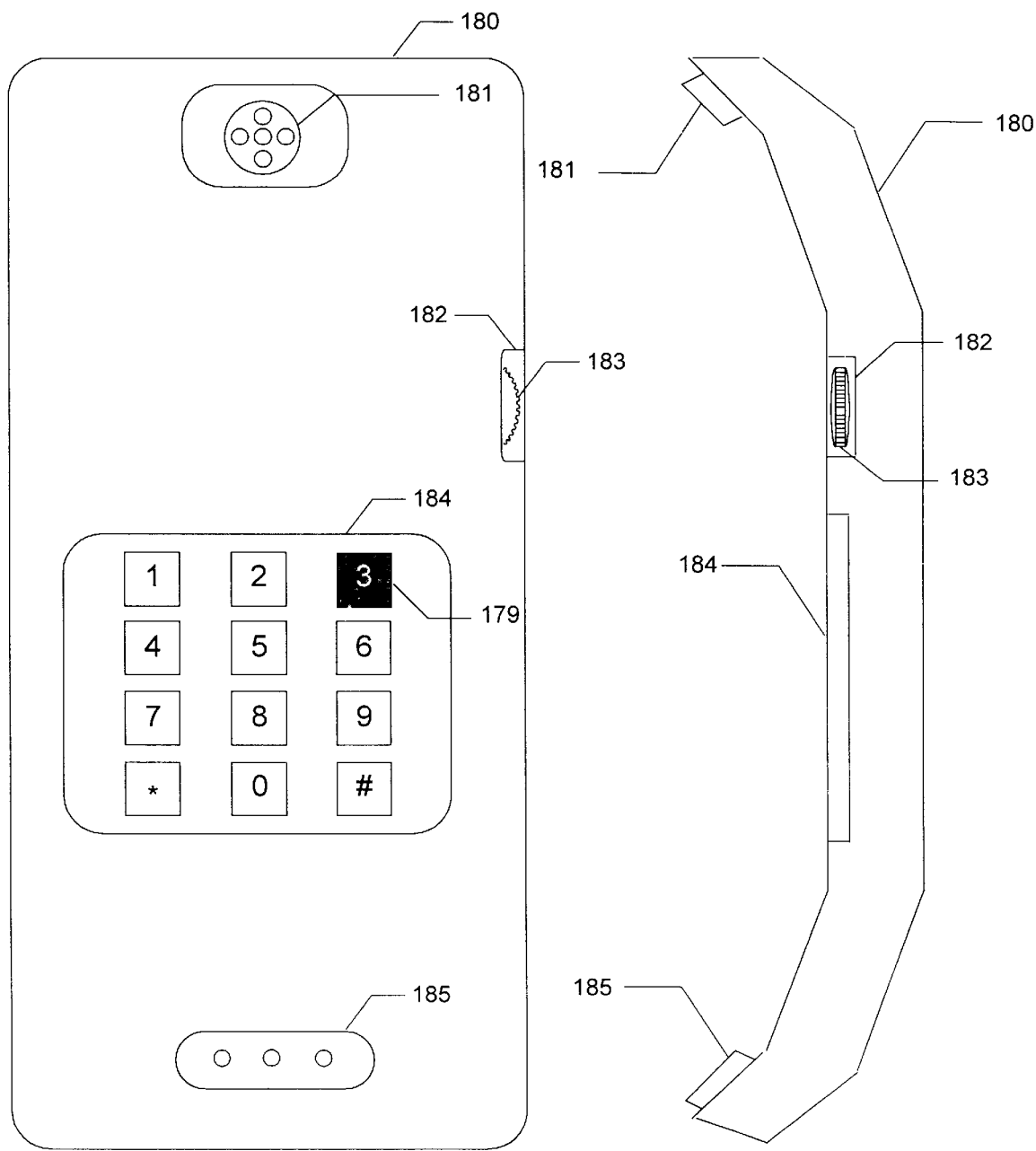
FIGS. 11a and 11b show front and side views of a physical configuration in which the menu and thumbwheel interface is used with a miniature cellular telephone, with the thumbwheel interface used for all dialing.
Figure 12A:
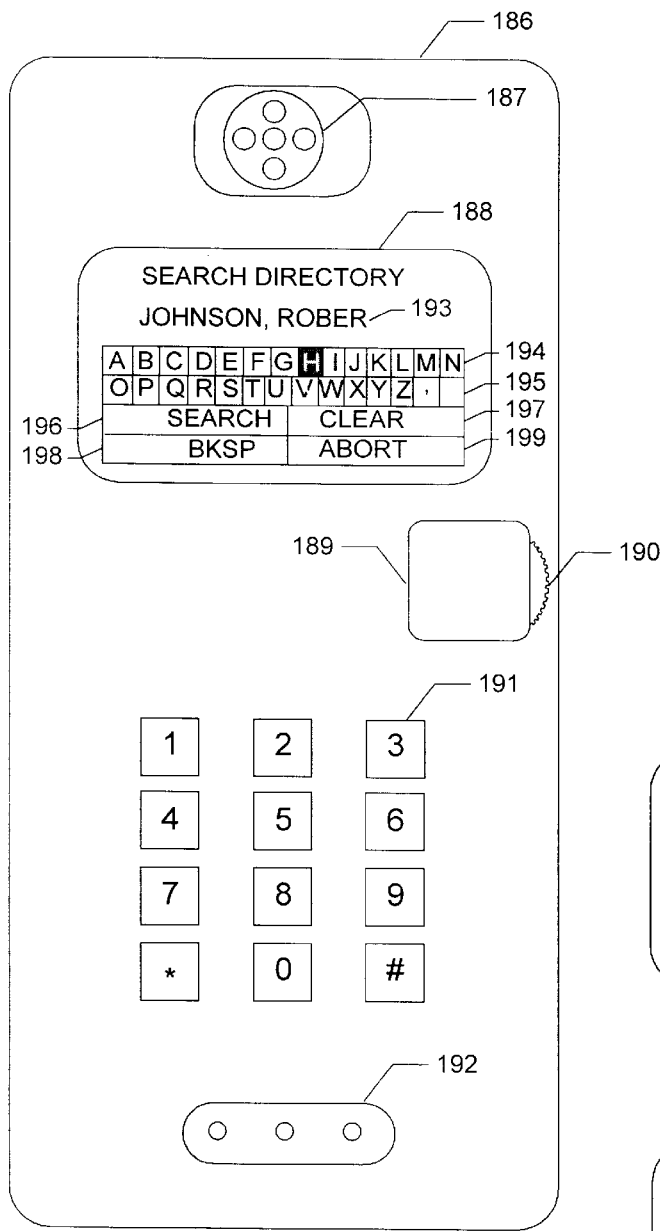
FIGS. 12a, 12b, 12c, 12d show front and side views of and sample screens for a physical configuration in which the menu and thumbwheel interface is used with a cellular telephone, with separate keys used for manual dialing.
Figure 12B:
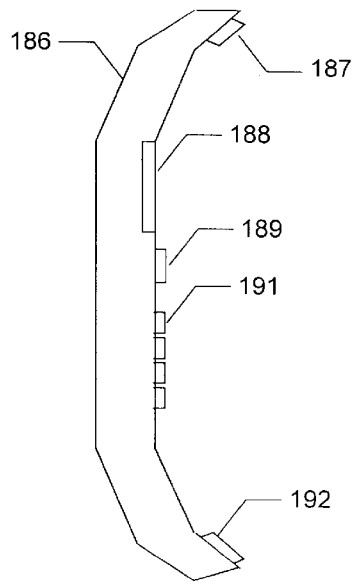

FIG. 11*a* and 11*b* show front and side views of a physical configuration in which the menu and thumbwheel interface is used with a miniature cellular telephone, with the thumbwheel interface used for all dialing. The package 180 contains a speaker 181, a recessed area 182 surrounded by plastic to protect the thumbwheel 183, a display 184, and a microphone 185. The display 184 shows, when the option of direct dialing is selected, the digits 1–9, 0, and the symbols * and # in the arrangement normally found on a telephone keyboard, with one key 179 typically designated by reverse video. Dialing can also be done automatically, using a digit sequence that has been retrieved from a telephone directory contained in the cellular telephone, as shown in FIGS. 12*a* and 12*c*.

FIG. 12*a*, 12*b*, 12*c*, and 12*d* show front and side views of and sample screens for a physical configuration in which the menu and thumbwheel interface is used with a cellular telephone, with separate keys used for manual dialing. The menu and thumbwheel interface is used for such features as search of a telephone directory and dialing from an internal telephone directory. The package 186 contains a speaker 187, display 188, a plastic enclosure 189 to protect a thumbwheel 190, keys (e.g., 191), and microphone 192. The display 188 shows a screen for searching the directory. Scrolling by means of the thumbwheel, as described in FIG. 8a, is an alternative way of retrieving a number. Movement of the thumbwheel designates letters in rows 194 and 195, and pressing the thumbwheel toward the body of the case selects a letter and adds it to the name field 193. "Bksp" 198 deletes the last letter entered and moves the cursor back one space, while "Clear" 197 erases the entire name field. "Search" 196 initiates a search of a telephone number, while "Abort" 199 causes the previous screen to the displayed.

Figure 12C:
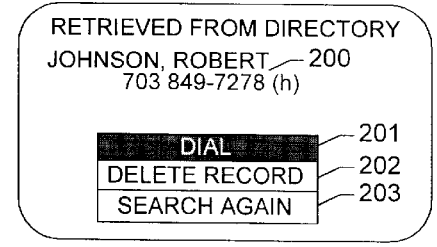

A successful search results in the display of the screen shown in FIG. 12c, indicating the retrieved name and telephone number 200, and the user can select "Dial" 201 to initiate dialing. The user might also want to delete the record 202 or modify the name field and search again by selecting "Search Again" 203.

Figure 12D:
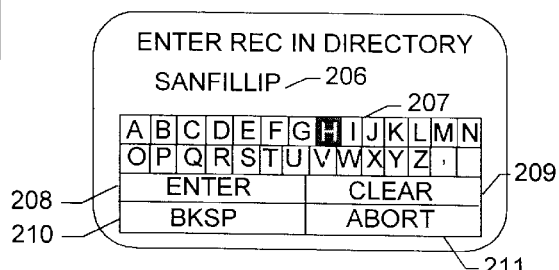

FIG. 12d shows a screen for entering a new record in the directory, including field for the name 206, a menu of alphabetic characters 207, and menu items "Enter" 208, "Backspace" 210, "Clear" 209, and "Abort" 211. "Enter" results in prompting for entry of the associated telephone number, while "Abort" aborts the process.

Transfer of data from a workstation telephone directory to the internal directory in the cellular telephone could be done by use of the telephone circuit to transfer data, with selection of the proper menu resulting in the cellular telephone dialing a particular preprogrammed number, logging on to a server (or the user's workstation), and performing an automatic directory correlation analogous to that shown in FIGS. 9 and 10 and described in the accompanying text.

The menu and thumbwheel interface is particularly applicable to new services that are expected to become available using the new frequency bands allocated to Personal Communications Services, in which cellular telephone service using fully digital transmission is expected to be combined with other services, such as paging services, including two-way paging. The user interface disclosed here can be used in two-way paging for the entry of alphanumeric text for composing a response, selection from canned responses that may be stored in the pager or included with a message transmitted to the pager, or use of a telephone directory and/or datebook contained in the pager. Details of the use of the interface for two-way paging in a building is disclosed in a copending application entitled "Wireless Personal Paging, Communications, and Locating System".

Figure 13:
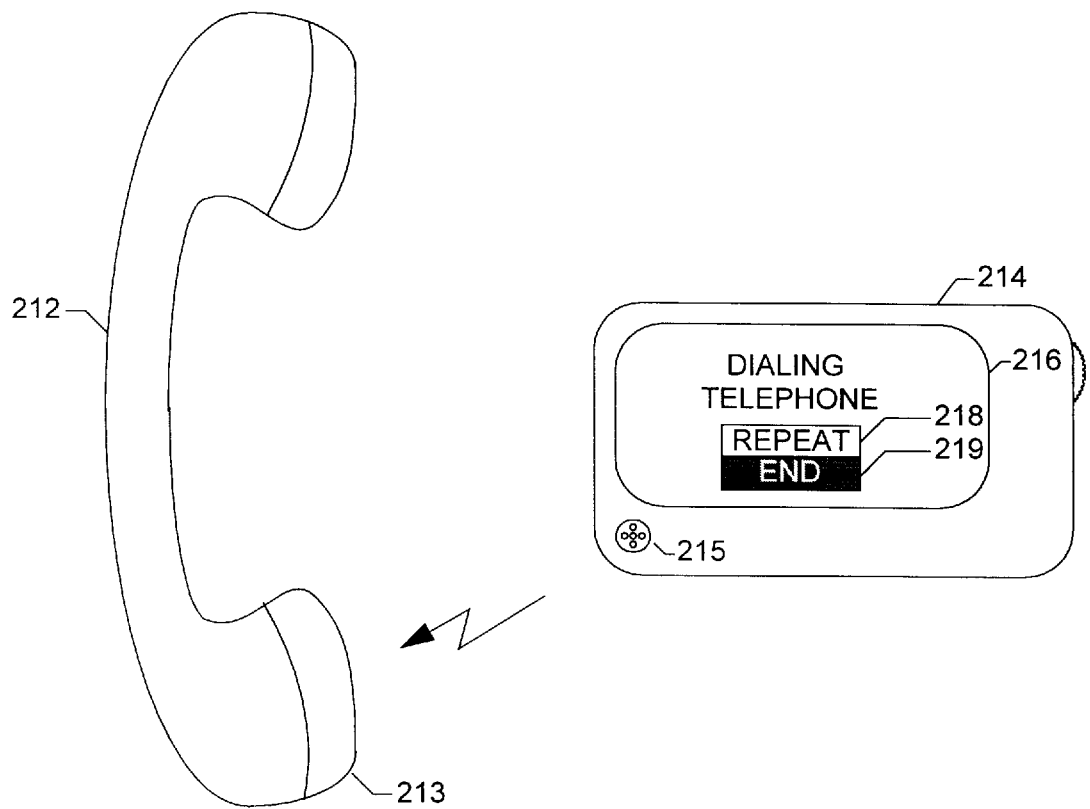
FIG. 13 shows a configuration in which the personal digital assistant is used to dial a telephone number that has been retrieved from the telephone directory, by means of dual tone multiple frequency codes.

FIG. 13 shows a configuration in which the personal digital assistant is used to dial a telephone number that has been retrieved from a directory, by means of dual tone multiple frequency codes. A telephone handset 212 is held near the PDA package 214, with the mouthpiece 213 near the speaker 215 contained in the PDA package.

When a telephone number is retrieved from memory, a choice of "Dial Telephone" is displayed. When that choice is selected, the PDA transmits a sequence of dialing signals, encoded as dual-tone-multiple-frequency (DTMF) tones. Details of the generation and transmission of this signal are disclosed in a copending application entitled "Automatic Setting of Timepiece by Telephone". If the data is not received correctly, the user can cause the dialing to be repeated, perhaps after adjusting the physical arrangement of the PDA and telephone for better reliability. While dialing the telephone, the PDA presents a display 216 with a menu containing the items "Repeat" 218, which, when selected, transmits the data again to cause dialing, and "End" 219 that terminates the dialing procedure.

Figure 14:
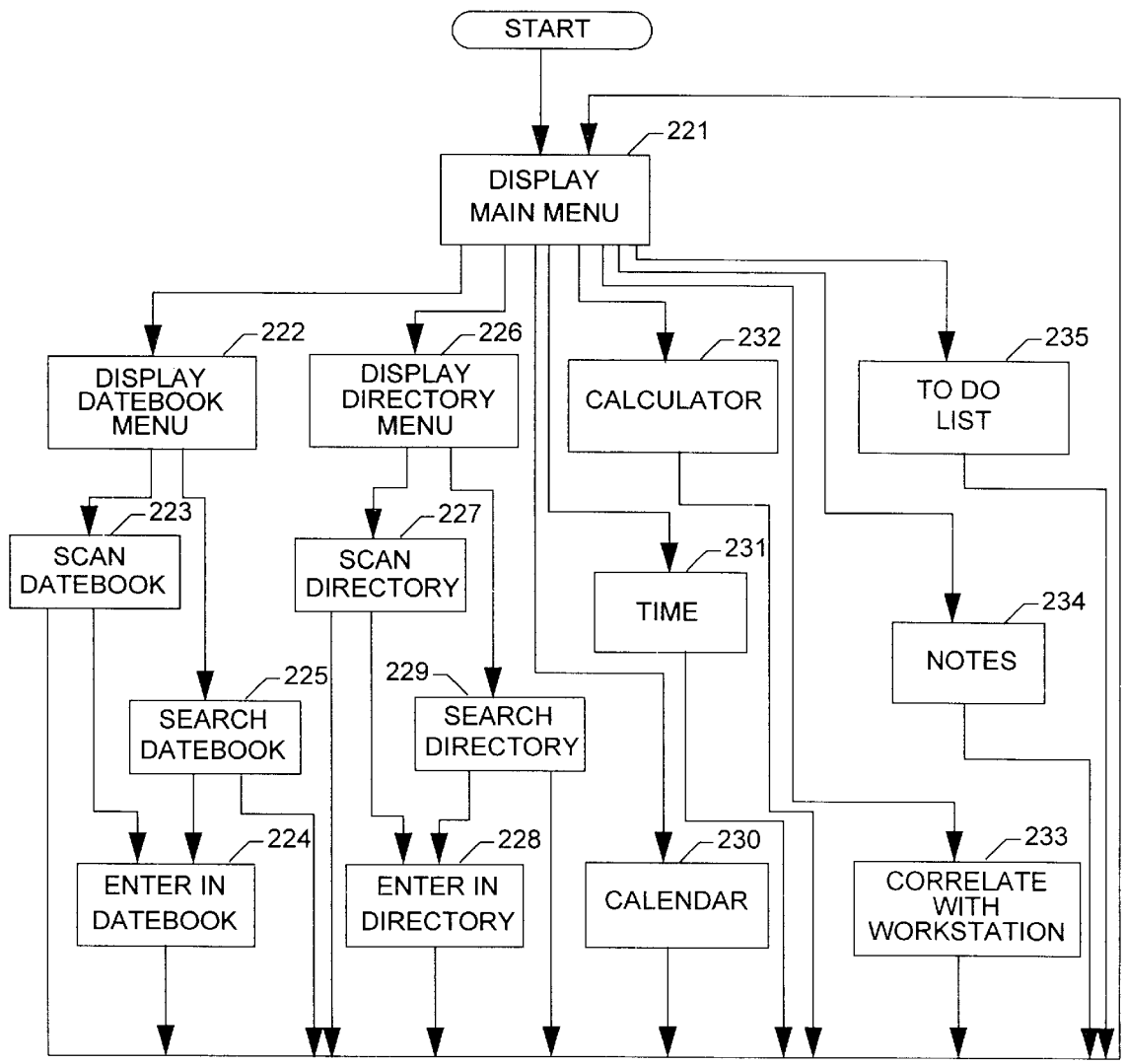
FIG. 14 shows a flowchart of the software for the microprocessor in the personal digital assistant.

FIG. 14 shows a flowchart of the software for the microprocessor in the personal digital assistant. When initiated, the program displays 221 the main menu, and waits for a press of the selector button. Note that interrupts are enabled and that a clock pulse or encoder pulse can generate an interrupt and result in execution of the interrupt software shown in FIG. 15.

Except in the case of the main menu, the selection of any choice by means of pressing the selector button is carried out only tentatively, with the software checking to see if a second press is done after a short delay. If so, the action taken after the first press is reversed and program control is transferred to step 221 to display the main menu.

Selection of the "Datebook" item results in display of the datebook menu 222, which consists of two principal choices: scan the datebook and search the datebook. When the scan mode is selected, the entry for a particular date is displayed, either for the current date (if the PDA includes a clock), or for the date of the last entry accessed.

Movement of the thumbwheel when scan mode is selected 223 results in display of the datebook entry for the given date, even if the datebook is blank for that date. If the entry is empty, the user can, if desired, press the selector button and display a menu of alphanumeric characters that can be entered into the datebook. Similarly, a filled datebook entry can be modified by pressing the selector button and displaying the same menu. In both cases, selecting the "Enter" item results in permanent storage 224 of the new or modified entry in the memory of the PDA, and program control is transferred to the main menu 221. "Abort" will result in return to the main menu 221 without modifying the memory. If the choice of searching the datebook 225 is made, a software module is entered to present the screen for such search and a name field accumulated using the alphabetic menu to build up the field letter by letter.

Selection of the "Directory" item results in display of the directory menu 226, which consists of three principal choices: scan the directory, search the directory, and make a new entry into the directory.

The selection of scan mode 227 results in display of the entry that was last accessed. Movement of the thumbwheel results in display of the directory entry further in the alphabet (if movement is clockwise) or earlier (if movement is counter-clockwise). Editing of the entry can be done by pressing the selector key to display a menu of alphanumeric characters, as is the case with the datebook. The selection of "Enter" results in storage 228 of the modified entry.

The selection of search mode 229 results in presentation of a screen in which the user can accumulate alphabetic characters in a name field by repeated selection of letters from a menu, and then select a search function. After a search, the result is displayed and can be edited. If "Enter" is selected after such editing, the modified entry is stored 228.

The search of the database directory is carried out by comparing the name field entered by the user against the name field for each record in the directory. Each record in the directory consists of a name field with N characters (including a comma, if used) and a free text field with M characters. The memory consists of an 8-bit byte for each memory location, with a total of P bytes allocated for the directory. A special character (e.g., an ASCII STX) defines the beginning of each name field, while an ETX defines the end of the name field and the beginning of the free text field, and EOF the end of the directory. For most purposes sequential searching, in which an STX is searched for and then the name field following is compared with the name sought, is adequate. If search time is a problem more sophisticated data structures that order records alphabetically, use directories, or techniques such as hash coding, can be used. If a record is found that compares that record is displayed to the user. If an EOF is encountered without any record that compares, a screen indicating that the search was unsuccessful is displayed to the user.

A new entry can also be made by selecting "New Entry" from the directory display menu 226, which presents a blank entry screen that can be composed, modified, and stored 228 by selecting "Enter".

If the function to be carried out is the entry of a new record in the database, the action depends upon the screen the user has been presented, the first of which allows the name to be entered, which is stored at the end of the current memory, and, when the user completes the name entry, an "ETX" is added to memory and the second screen is presented to the user, which allows him or her to enter a telephone number, and then complete the record entry by selecting the "Enter" response. When this occurs an "EOF" is added at the end. If either screen aborts, the "EOF" is returned to the location just after the last complete entry.

Selection of the Calendar item results in display 230 of a calendar for a given month in the usual format, with columns headed by days of the week and dates displayed in rows for each week in the month. If a clock is included, the month displayed is the current month; otherwise, the last month accessed is displayed. Thereafter, movement of the thumbwheel clockwise displays a later month; movement counterclockwise displays an earlier month. A single click of the selector button returns the PDA to the main menu 221.

Selection of the "Time" item 231 causes the PDA to display the month, date, day-of-the-week and time-of-day. In addition, pressing the selector button will display a menu that allows the user to set the time and date information.

If the function to be carried out is the setting of the clock, the user chooses the appropriate screen for setting the parameter that must be reset, resetting each parameter one by one until the correct time is displayed. Also included in the list of parameters that can be set is a "Set seconds" screen, which simply presents the tentative time in hours, minutes, and seconds (with the seconds continuously being updated) and provides the user with the choice of resetting the seconds parameter to 0, to 30, or to return without modification.

If the function to be carried out is the deletion of a record, the record is located and the length of the record in bytes calculated, including the special characters. The remaining data in the memory just after the record to be deleted is then moved up in memory, beginning at the location storing the first data character in the record to be deleted.

Once any time parameter is modified, all references to the time will use that new parameter, and the new time will be updated by the ticking of the clock. However, the time will not be finalized until the verification step. For more details about using the thumbwheel to set the time and date, see the copending application entitled "Control of Digital Watch Using Menu and Thumbwheel".

Selection of the Calculator item results in the calculator screen 232 being presented. When an item from that screen is selected, and the item is a digit 0–9 or the decimal point, the character is added to a string of numbers and operators being held for evaluation, and the leftmost N characters (where N is the number of characters that can be displayed) are displayed. (For example, the string "3*4" might have a "1" added to result in "3*41".) If the item is an operator (+,−,*, or /), or parentheses to indicate precedence, it is also added to the string and the result displayed. It the item is an "=", the string is evaluated, and the numerical result only placed in a new string, (e.g., "123") and displayed in the accumulator field.

Selection of the Correlate with Workstation item 233 causes the PDA to enter the state in which changes made to data in the PDA loaded (via an infrared communications link) from the workstation are transmitted to the workstation, and the user then working at the workstation to correlate the changes and create a new version of a directory that is then transmitted to the PDA. See FIGS. 9 and 10 and associated text for details.

Selection of the Notes item 234 results in display of a text field that is essentially the same as the datebook entry for a particular date, except that the "Notes" label is displayed instead of the date. Users can enter, modify, and delete text that constitutes notes a user wants to retain.

Selection of the "To Do List" item 235 results in display of a text field that is essentially the same as the datebook entry for a particular date, except that the "To Do" label is displayed instead of the date. Users can enter, modify, and delete text that constitutes a list of things to do.

Figure 15:
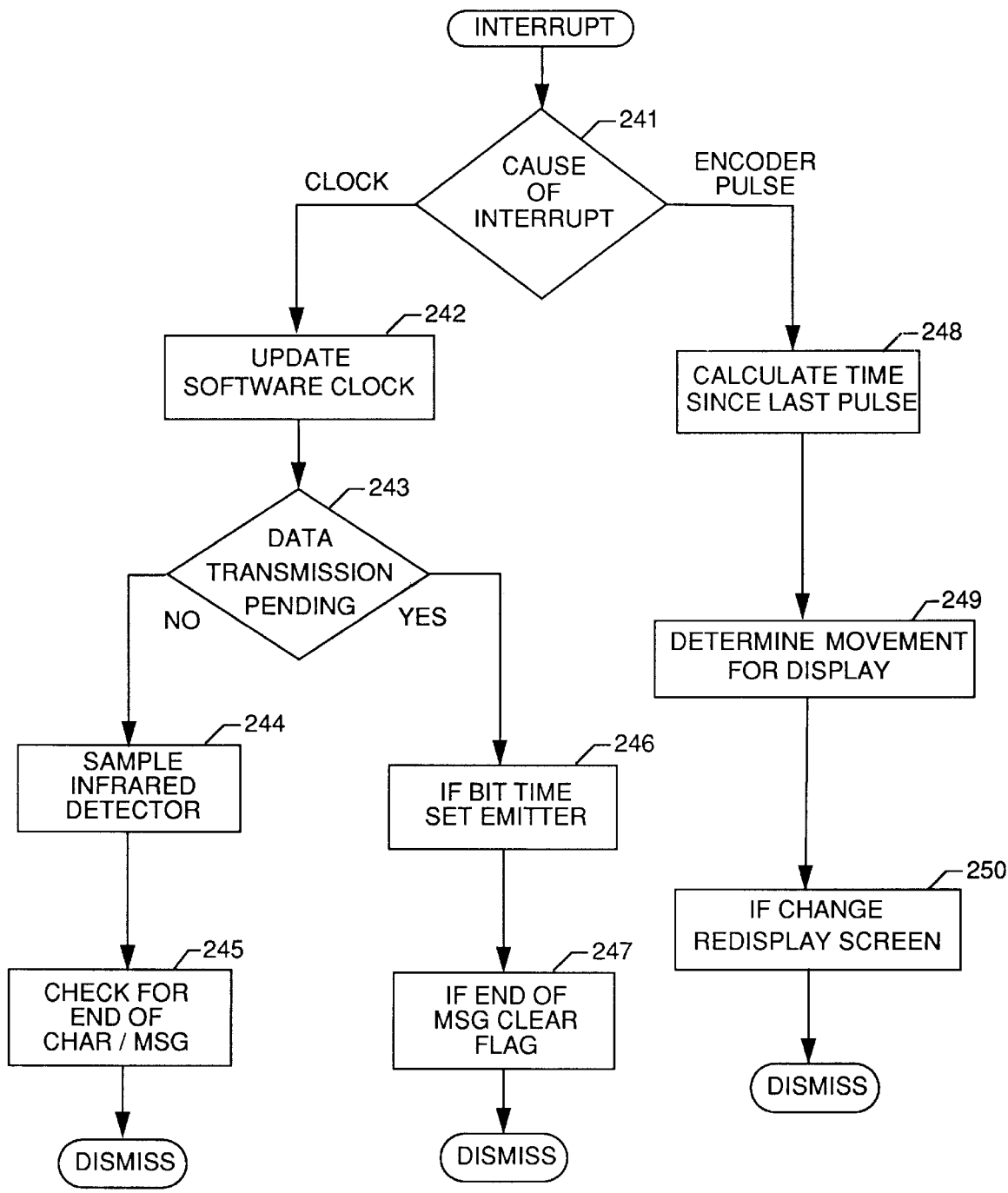
FIG. 15 shows a flowchart of the interrupt software for the microprocessor.

FIG. 15 shows a flowchart of the interrupt software for the microprocessor. When an interrupt occurs, a test is made 241 of the cause of the interrupt. If it is the clock, the software clock (contained in the random access memory) is first incremented as follows: A counter is incremented and tested to see if it has reached 78,600, indicating that one second has elapsed. If so, the seconds counter is incremented. If it has reached 60, it is reset to 0 and a carry generated to increment the minutes counter. If the minutes counter has reached 60, it is reset to 0 and a carry generated to increment the hours counter. If the hours counter has reached 13, it is reset to 1 and the AM/PM flag toggled. (If the clock is in a 24-hour mode, the equivalent is performed). If the hours counter and AM/PM flag indicate that a new day has arrived, the day and date counters are incremented. If the date counter indicates a new month has arrived, the month counter is incremented and the date is reset. If the month counter indicates that a new year has arrived, the month counter is reset. A further test is then made 243 of whether a data transmission is pending. If no, the infrared detector is sampled 244, and a check is made 245 of whether the end of the character or message has been reached. If the end of the character has been received, the bits that have been stored separately are shifted together into one word and stored in memory, and the count of characters received incremented by one. If the end of the message has been received, a cyclic redundancy check is computed and compared against the the check contained in the message. If the check does not match, the data in the message is discarded. If the check does match, a flag is set to indicate that data from the message is available for processing by the main program. In all cases, the interrupt routine is then dismissed.

If (test 243) a data transmission is pending and another bit is available for the current character, the state of the infrared emitter is set 246 to 0 or 1 depending upon the state of the bit, and the count of bits transmitted incremented. If the end of the character has been transmitted, another character in the message to be transmitted is retrieved. If the last character in the message has been transmitted, the flag indicating that data transmission pending is cleared 247. The interrupt routine then dismisses.

If the cause of the interrupt is a pulse from the thumbwheel encoder having been received, the time that the last pulse was received from the encoder is subtracted from the time stored in the software clock in the random access memory to calculate 248 the elapsed time since the last pulse. A calculation is then made 249 of the distance that the designation on the display should be moved as a result of the pulse received from the encoder. If the screen has a menu of items, the amount of movement determines which item will be designated by reverse video. If the screen displays a parameter (e.g., minutes) where the potential values and their order are obvious and thus not displayed in menu form, the amount of display "movement" determines the value that will replace that displayed in the field designated by reverse video. The display movement results from three factors: (1) the amount of actual physical movement of the thumbwheel; (2) the speed of thumbwheel movement; and (3) the form of screen and menu display. In the case of screen displays containing menus with only one item per line, the movement on the display is proportional to the vertical distance of the lines in the menu transversed. In the case of screen displays containing menus with multiple items per line (such as the digits 0–9), the amount of movement on the display is proportional to the cumulative horizontal distance transversed. In some cases it may be desirable to add a correction factor (e.g., 0.75) to be multiplied by the virtual movement to compensate for the tendency for humans to understate such horizontal distances by perceiving them in terms of areas rather than cumulative distances.

If the screen has changed from that previously displayed as a result of the receipt of the pulse, the screen is redisplayed 250. The interrupt routine then dismisses.

I claim:

1. A method for control of a miniature handheld computing system, comprising the steps of:
   displaying an ordered sequence of items in a menu, in which one of the items from said ordered sequence is designated at any given time as tentatively selected by displaying it in a manner distinct from that of other menu items;
   rotating a cylinder and determining the direction and amount of movement of said cylinder;
   moving the designation of a menu item in a particular direction and distance within the ordered sequence, depending upon the direction and distance said cylinder was rotated;
   repeating the steps of rotating the cylinder, determining the amount of movement, and moving the designation of a menu item until a menu item desired by the user is designated;
   actuating a switch to complete the selection of said desired menu item.

2. The method of claim 1, wherein the distance that the designation of a menu item moves is calculated by multiplying the distance traveled by a point on the circumference of the cylinder by a factor that is an increasing function of the rate of movement of the cylinder.

3. The method of claim 2, wherein the distance that the designation of a menu item moves is proportional to both the distance traveled by a point on the circumference of the cylinder and to a constant, with said constant having one value when the rate of movement of the cylinder is below a given threshold value, and a different value when said rate of movement is above said threshold value.

4. The method of claim 1, wherein an attempt to move the designated menu item beyond either end of the sequence of menu items will result in the display of one or more additional menu items, simultaneous removal of the display of that menu item at the opposite end of the sequence, and the shifting of all intervening horizontal lines up or down, as appropriate, should there be more items in the menu that can be displayed at a given time.

5. The method of claim 1, wherein the designated menu item has its lettering displayed at the intensity level used for display of the background in undesignated menu items and the background of said designated menu item is displayed at the intensity level used for display of the lettering in undesignated menu items.

6. The method of claim 1, further comprising the steps of:
   pressing the selector button;
   pressing the selector button a second time within 500 mS of the time of the first press;
   presenting a basic menu screen.

7. The method of claim 1, further comprising the steps of:
   selecting an item from the presented menu;
   presenting another menu of items.

8. A method for the control of a miniature handheld computing system, comprising the steps of:
   displaying an ordered sequence of items in a menu whereby a plurality of menu items are presented such that at least one item appears above another item, and at least one item appears to the left of another item, with one of the items from said ordered sequence designated at any given time as tentatively selected by displaying it in a manner distinct from that of other menu items;
   rotating a cylinder and determining the direction and amount of movement of said cylinder;
   moving the designation of a menu item in a particular direction within the ordered sequence, depending upon the direction and distance said cylinder was rotated;
   repeating the steps of rotating the cylinder, determining the amount of movement, and moving the designation of a menu item until a menu item desired by the user is designated;
   actuating a switch to complete the selection of said desired menu item.

9. The method of claim 8, wherein the cylinder is rotated in a direction such that the axis of rotation is perpendicular to the plane of the display.

10. The method of claim 8, wherein the display comprises a set of horizontal lines, with more than one menu item presented in at least one horizontal line, with the designation moving from left to right within a line and from the last item on one line to the first item on the line below as the cylinder moves in a clockwise direction.

11. The method of claim 10, wherein the distance the designation of a menu item moves is proportional to the cumulative horizontal distance of the entire display occupied by the menu items, should the menu have more than one item in any horizontal line, for a given amount of movement of the cylinder and correction for the rate of movement.

12. The method of claim 8, wherein the menu items comprise a set of numerical digits and mathematical operators that can be entered to control a calculator.

13. The method of claim 8, wherein the menu items comprise a set of alphanumeric characters that can be entered into the memory of a miniature handheld computing system.

14. The method of claim 8, wherein said miniature handheld computing system comprises an information storage and retrieval system containing names and telephone numbers.

15. The method of claim 8, wherein said miniature handheld computing system comprises a calendar capable of storing and retrieving text associated with particular dates.

16. An apparatus for control of a miniature handheld computing device, comprising:

- a microprocessor;
- a memory for storage of a computer program controlling said microprocessor and for other information;
- a flat panel display for presenting information from the microprocessor to the user;
- a cylinder capable of rotation in either direction;
- means for determining the direction and amount of movement of said cylinder and providing that information to the microprocessor;
- a selector button the state of which is provided to the microprocessor.

17. The apparatus of claim 16, wherein the cylinder is connected to a switch that closes, given sufficient pressure in a direction toward the axis of the rotation of the cylinder, with the closing of said switch causing selection of the desired menu item, thus allowing the cylinder to serve as the selector button.

18. The apparatus of claim 16, wherein the length of the rotating cylinder is one-fifth or less of its diameter.

19. The apparatus of claim 18, wherein the rotating cylinder is mounted within the packaging of the handheld computing device such that the axis the cylinder rotates around is perpendicular to the plane of the display, but with a portion of the circumference of the cylinder exposed at any given time so as to allow the cylinder to be moved by the user.

20. The apparatus of claim 16, wherein said handheld computing device is contained in a package with the vertical and horizontal dimensions of a standard credit card and a thickness of 0.25 inches or less.

\* \* \* \* \*

UNITED STATES PATENT AND TRADEMARK OFFICE
CERTIFICATE OF CORRECTION

PATENT NO. : 5,825,353
DATED : October 20, 1998
INVENTOR(S) : Craig Alexander Will It is certified that error appears in the above-identified patent and that said Letters Patent is hereby corrected as shown below:

On the first page, the following is added just below the inventor's name:

--[ * ] Notice: The term of this patent shall not extend beyond the expiration date of Pat. No. 5,477,508.--

Signed and Sealed this

Eleventh Day of April, 2000

Attest:

Attesting Officer

Q. TODD DICKINSON

Director of Patents and Trademarks